(12) United States Patent
Cho et al.

(10) Patent No.: US 10,593,986 B2
(45) Date of Patent: Mar. 17, 2020

(54) RECHARGEABLE BATTERY

(71) Applicant: SAMSUNG SDI CO., LTD., Yongin-si, Gyeonggi-do (KR)

(72) Inventors: Seongbong Cho, Yongin-si (KR); Jeongsoon Shin, Yongin-si (KR); Young-Jun Lee, Yongin-si (KR); Taewoo Kim, Yongin-si (KR)

(73) Assignee: Samdung SDI Co., Ltd., Yongin-si (KR)

( * ) Notice: Subject to any disclaimer, the term of this patent is extended or adjusted under 35 U.S.C. 154(b) by 216 days.

(21) Appl. No.: 15/599,370

(22) Filed: May 18, 2017

(65) Prior Publication Data

US 2017/0338509 A1 Nov. 23, 2017

(30) Foreign Application Priority Data

May 19, 2016 (KR) .......................... 10-2016-0061604

(51) Int. Cl.
*H01M 10/04* (2006.01)
*H01M 2/18* (2006.01)
*H01M 2/02* (2006.01)

(52) U.S. Cl.
CPC ....... *H01M 10/0431* (2013.01); *H01M 2/028* (2013.01); *H01M 2/0287* (2013.01); *H01M 2/18* (2013.01); *H01M 10/0459* (2013.01)

(58) Field of Classification Search
None
See application file for complete search history.

(56) References Cited

U.S. PATENT DOCUMENTS

| | | | |
|---|---|---|---|
| 3,558,358 A | 1/1971 | Ropp, Jr. | |
| 4,668,320 A * | 5/1987 | Crabtree | ................ H01M 2/18 156/192 |
| 8,119,274 B2 | 2/2012 | Park et al. | |
| 2002/0160257 A1 | 10/2002 | Lee et al. | |
| 2016/0240883 A1* | 8/2016 | Kim | .................... H01M 10/045 |

FOREIGN PATENT DOCUMENTS

| | | |
|---|---|---|
| JP | 56-134476 | 10/1981 |
| JP | 2003-344020 A | 12/2003 |
| JP | 2013-247031 A | 12/2013 |
| KR | 10-2001-0082059 A | 8/2001 |
| KR | 10-2007-0118715 A | 12/2007 |
| KR | 10-2013-0124098 A | 11/2013 |

OTHER PUBLICATIONS

EPO Extended Search report dated Oct. 6, 2017, for corresponding European Patent Application No. 17171956.0 (7 pages).

* cited by examiner

*Primary Examiner* — Karie O'Neill Apicella
(74) *Attorney, Agent, or Firm* — Lewis Roca Rothgerber Christie LLP

(57) ABSTRACT

A rechargeable battery having increased capacity while facilitating a manufacturing process is provided. A rechargeable battery includes: an electrode assembly including at least a unit body including a first region and a second region that are divided based on a folding center in which separators including at least two facing sheets are folded, and electrode plates of a first electrode and electrode plates of a second electrode, and the electrode plates of the first electrode and the electrode plates of the second electrode are alternately stacked with the separators therebetween in each of the first region and the second region; and a case receiving the electrode assembly and an electrolyte solution.

28 Claims, 23 Drawing Sheets

RECHARGEABLE BATTERY

CROSS-REFERENCE TO RELATED APPLICATION

This application claims priority to and the benefit of Korean Patent Application No. 10-2016-0061604, filed on May 19, 2016 in the Korean Intellectual Property Office, the entire content of which is incorporated herein by reference.

BACKGROUND

1. Field

Aspects of embodiments of the present disclosure relate to a rechargeable battery.

2. Description of the Related Art

A rechargeable battery can be repeatedly recharged and discharged, unlike a primary battery. A low-capacity rechargeable battery is used for small portable electronic devices, such as a mobile phone, a notebook computer, and a camcorder, and a large-capacity rechargeable battery is used as a power supply for driving a motor, such as for a hybrid vehicle.

For example, the rechargeable battery includes an electrode assembly undergoing the charge and discharge, and a pouch or a case receiving the electrode assembly and an electrolyte solution. The electrode assembly may be made as any of a stacked type, a spiral-wound type, and a stacked spiral-wound mixed type depending on a structure of the electrode and the separator.

In the stacked type of electrode assembly, it is difficult to align the electrode and the separator, such that the manufacturing process is complicated. When the spiral-wound type of electrode assembly is deformed in a plate shape after the spiral-winding and is inserted into the pouch, an empty space within the pouch is largely formed, such that the capacity may be decreased.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, a rechargeable battery has increased capacity while facilitating a manufacturing process thereof. According to an aspect of embodiments of the present invention, a rechargeable battery is obtained having production efficiency and quality stability. According to another aspect of embodiments of the present invention, a rechargeable battery includes an electrode assembly made from a unit body formed by stacking and folding an electrode and a separator in a continuous process.

A rechargeable battery according to one or more exemplary embodiments of the present invention includes: an electrode assembly including at least a unit body including a first region and a second region that are divided based on a folding center in which separators including at least two facing sheets are folded, and electrode plates of a first electrode and electrode plates of a second electrode, wherein the electrode plates of the first electrode and the electrode plates of the second electrode are alternately stacked with the separators therebetween in each of the first region and the second region; and a case receiving the electrode assembly and an electrolyte solution.

The unit body may include a same number of the electrode plates of the first electrode, the electrode plates of the second electrode, and the separators.

The separators may include an outer sheet arranged outermost of two sheets arranged to be folded and an inner sheet arranged innermost of the two sheets arranged to be folded.

The first electrode may include a first first electrode plate arranged in the first region; and a second first electrode plate arranged in the second region between the outer sheet and the inner sheet.

The second electrode may include a first second electrode plate corresponding to the first first electrode plate and arranged in the first region outside the outer sheet, and a second second electrode plate corresponding to the second first electrode plate and arranged in the second region inside the inner sheet.

The unit body may form one unit cell by the first second electrode plate, the outer sheet, the first first electrode plate, and the inner sheet in the first region, may further form one unit cell by the second second electrode plate, the inner sheet, the second first electrode plate, and the outer sheet in the second region, and may further form one unit cell by the first first electrode plate, the inner sheet, and the second second electrode plate between the first region and the second region through the folding of the outer sheet and the inner sheet.

The electrode assembly may be formed by stacking and electrically connecting a plurality of unit bodies.

The electrode assembly may further include an outermost unit body provided at an outermost side thereof.

The outermost unit body may include a same number of the electrode plates of the first electrode and the separators, and may include a smaller number of the electrode plates of the second electrode than the electrode plates of the first electrode by one.

The separators in the outermost unit body may include an outer sheet arranged outermost of two sheets arranged to be folded and an inner sheet arranged innermost of the two sheets arranged to be folded, the first electrode may include a first first electrode plate in the first region and a second first electrode plate arranged in the second region between the outer sheet and the inner sheet, and the second electrode may include a second second electrode plate corresponding to the first first electrode plate and the second first electrode plate inside the folded inner sheet and arranged in the second region.

The outermost unit body may form one unit cell by the second second electrode plate, the inner sheet, the second first electrode plate, and the outer sheet in the second region, and may further form one unit cell by the outer sheet, the first first electrode plate, the inner sheet, and the second second electrode plate, between the first region and the second region by the folding of the outer sheet and the inner sheet.

The outermost unit body may be formed by arranging the separators at both surfaces of the first electrode, the separators may include an outer sheet and an inner sheet, and the first electrode may include a third first electrode plate between the outer sheet and the inner sheet.

The separator may include an outer sheet arranged outermost of three sheets arranged to be folded, an inner sheet arranged innermost of the three folded sheets, and a middle sheet between the outer sheet and the inner sheet.

The first electrode may include a first first electrode plate arranged in the first region, a second first electrode plate arranged in the second region, and a fourth first electrode plate arranged within the folded inner sheet between the outer sheet and the middle sheet.

The second electrode may include a first second electrode plate corresponding to the first first electrode plate and arranged in the first region outside the outer sheet, a fifth second electrode plate corresponding to the first first electrode plate and the fourth first electrode plate and arranged in the first region between the middle sheet and the inner sheet, and a sixth second electrode plate corresponding to the second first electrode plate and the fourth first electrode plate and arranged in the second region.

The unit body may form two unit cells by the first second electrode plate, the outer sheet, the first first electrode plate, the middle sheet, the fifth second electrode plate, and the inner sheet in the first region, may further form two unit cells by the fourth first electrode plate, the inner sheet, the sixth second electrode plate, the middle sheet, the second first electrode plate, and the outer sheet in the second region, and may further form one unit cell by the fifth second electrode plate, the inner sheet, and the fourth first electrode plate between the first region and the second region by the folding of the outer sheet, the middle sheet, and the inner sheet.

The electrode assembly may be formed by stacking and electrically connecting a plurality of unit bodies.

The electrode assembly may further include an outermost unit body provided at an outermost side thereof, and the outermost unit body may form one unit cell by the second second electrode plate, the inner sheet, the second first electrode plate, and the outer sheet in the second region, and may further form one unit cell by the outer sheet, the first first electrode plate, the inner sheet, and the second second electrode plate between the first region and the second region by the folding of the outer sheet and the inner sheet.

The electrode assembly may further include an outermost unit body provided at an outermost side thereof, the outermost unit body may be formed by arranging the separators at both surfaces of the first electrode, the separators may include an inner sheet and an outer sheet, and the first electrode may include a third first electrode plate between the outer sheet and the inner sheet.

The outer sheet may further include an extending part, and the extending part may cover an outermost side of the plurality of stacked unit bodies and may be fixed by a finishing tape.

The second electrode may be provided between the middle sheet and the inner sheet, and may include a fifth second electrode plate corresponding to the first first electrode plate and the fourth first electrode plate and arranged in the first region, and a sixth second electrode plate corresponding to the second first electrode plate and the fourth first electrode plate and arranged in the second region.

The unit body may form one unit cell by the outer sheet, the first first electrode plate, the middle sheet, the fifth second electrode plate, and the inner sheet in the first region, may further form two unit cells by the fourth first electrode plate, the inner sheet, the sixth second electrode plate, the middle sheet, the second first electrode plate, and the outer sheet in the second region, and may further form one unit cell by the fifth second electrode plate, the inner sheet, and the fourth first electrode plate between the first region and the second region by the folding of the outer sheet, the middle sheet, and the inner sheet.

In the electrode assembly, the unit body may be stacked at an outermost side thereof to be electrically connected to other unit bodies.

The electrode assembly may further include an additional unit body provided at an outer side of the outermost unit body, the additional unit body may include a separator as an outer sheet arranged outside the second electrode, and the second electrode may include a third second electrode plate arranged between the outer sheet of the additional unit body and the outer sheet of the outermost unit body.

The outermost unit body may include an outer sheet arranged outermost and an inner sheet arranged innermost, the first electrode may include a first first electrode plate and a second first electrode plate arranged between the outer sheet and the inner sheet that are folded, and the second electrode may include a second second electrode plate corresponding to the first first electrode plate and the second first electrode plate and arranged inside the folded inner sheet.

The outermost unit body may include an outer sheet arranged outermost and an inner sheet arranged innermost, and a middle sheet between the outer sheet and the inner sheet, the first electrode may include a first first electrode plate and a second first electrode plate arranged between the outer sheet and the middle sheet, and a fourth first electrode plate arranged between the folded inner sheet, and the second electrode may include a fifth second electrode plate arranged corresponding to the first first electrode plate and the fourth first electrode plate between the middle sheet and the inner sheet, and a sixth second electrode plate arranged corresponding to the second first electrode plate and the fourth first electrode plate.

According to an exemplary embodiment of the present invention, the electrode assembly is formed of at least one unit body in which the plurality of separators face each other and are folded, and the electrode plates of the first electrode and the electrode plates of the second electrode are alternately stacked in each of the first and second regions such that the capacity of the battery may be easily increased. The unit body is formed by arranging the electrode plates of the first and second electrodes between the folded separators such that the improved production efficiency and quality stability may be obtained.

Figure 1:
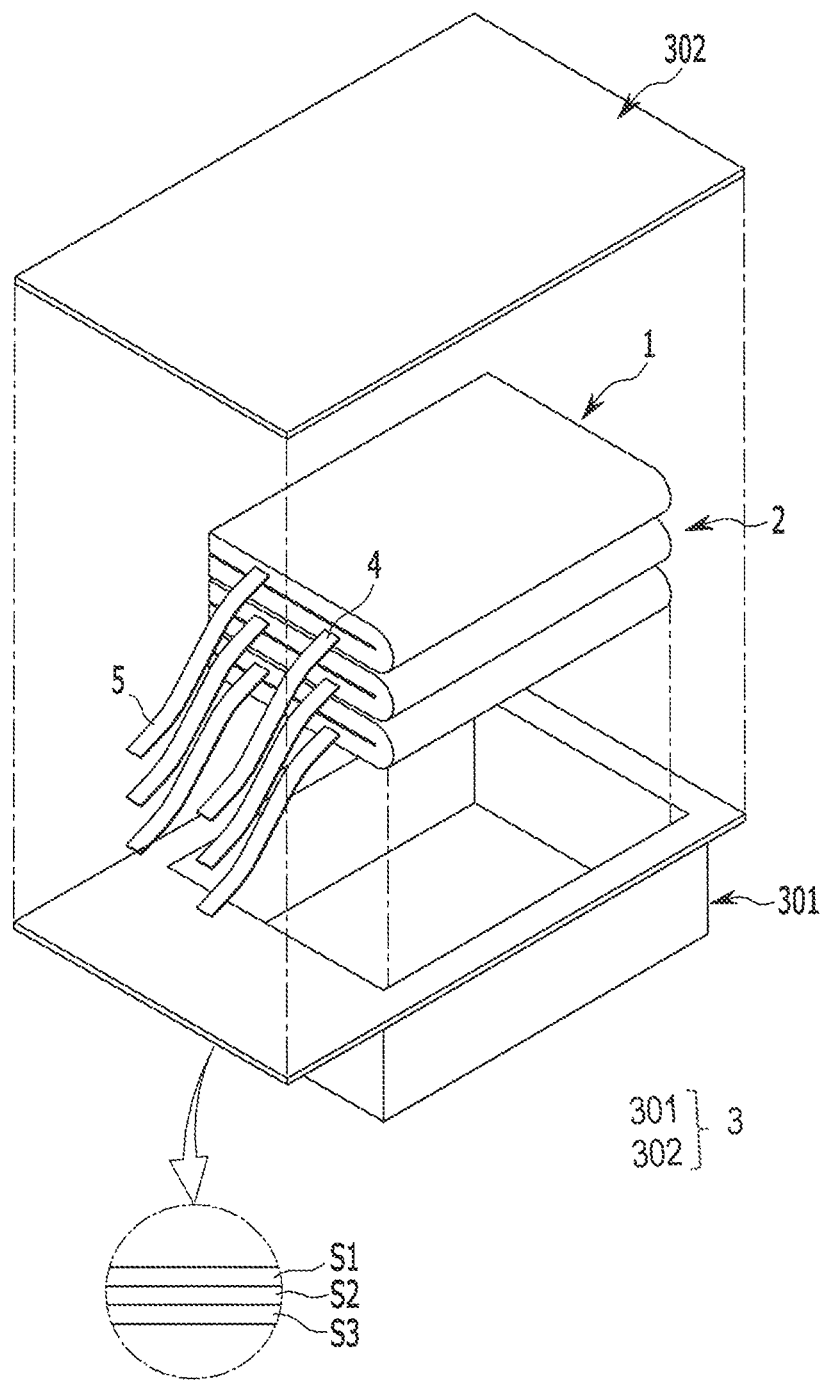
FIG. 1 is an exploded perspective view of a rechargeable battery according to an exemplary embodiment of the present invention.

DESCRIPTION OF SYMBOLS 1, 1', 81, 81': unit body
2, 2', 2", 6, 7, 7', 8, 8', 8", 94, 95: electrode assembly

| | |
|---|---|
| 3: case | 4, 5: lead tab |
| 10, 50: first electrode | 11: first first electrode plate |
| 12: second first electrode plate | 13: third first electrode plate |
| 14: fourth first electrode plate | 20, 20', 80, 80': second electrode |
| 21: first second electrode plate | 22: second second electrode plate |
| 25: fifth second electrode plate | 26: sixth second electrode plate |
| 30, 40, 90: separator | 31, 41, 91: outer sheet |
| 31E: extending part | 32, 42, 93: inner sheet |
| 61, 71: outermost unit body | 72: additional unit body |
| 92: middle sheet | 301: first exterior portion |
| 302: second exterior portion | AR1: first region |
| AR2: second region | S1: inner sheet |
| S2: metal sheet | S3: outer sheet |
| T1, T2: finishing tape | |

DETAILED DESCRIPTION

The present invention will be described more fully herein with reference to the accompanying drawings, in which some exemplary embodiments of the present invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is an exploded perspective view of a rechargeable battery according to an exemplary embodiment of the present invention. Referring to FIG. 1, the rechargeable battery according to an exemplary embodiment of the present invention includes an electrode assembly 2 including at least one unit body 1, a case 3 receiving the electrode assembly 2 and an electrolyte solution, and lead tabs 4 and 5 electrically connected to the electrode assembly 2 and drawn outside of the case 3.

In an exemplary embodiment, a rechargeable battery of a pouch type in which the case is formed as a pouch is described; however, the present invention may also be applied to a rechargeable battery of a can type, for example, in which the case is formed as a rectangular can (not shown).

Also, in an exemplary embodiment, a rechargeable battery in which the lead tabs 4 and 5 are drawn out at one side of the case 3 is described; however, the present invention may be applied to a rechargeable battery in which the lead tabs are drawn out at both sides of the case (not shown).

Figure 2:
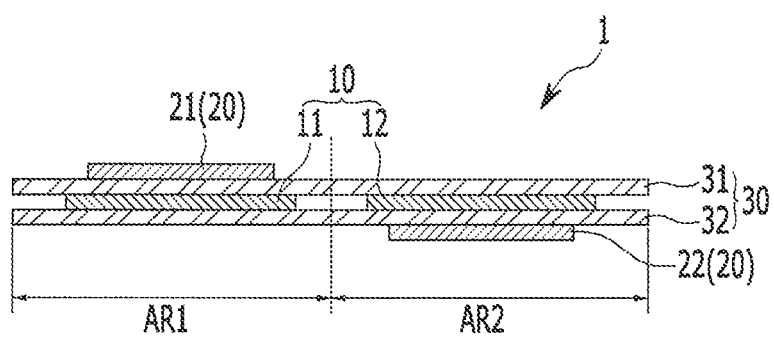
FIG. 2 is a cross-sectional view of a state in which electrode plates and separators are stacked to form a unit body applied to an electrode assembly of the rechargeable battery of FIG. 1.
Figure 3:
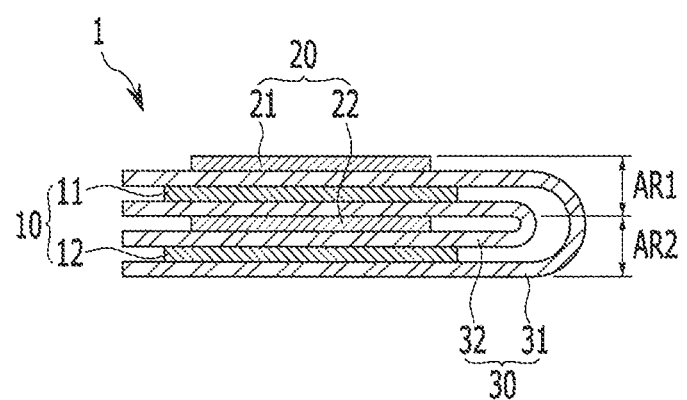
FIG. 3 is a cross-sectional view of a unit body formed by folding separators in a stacked state of FIG. 2.

FIG. 2 is a cross-sectional view of a state in which electrode plates and separators are stacked to form a unit body applied to an electrode assembly of FIG. 1; and FIG. 3 is a cross-sectional view of a unit body formed by folding separators in a stacked state of FIG. 2.

Referring to FIG. 2 and FIG. 3, the unit body 1 includes a plurality of separators 30 facing each other to be folded, and a first electrode 10 (e.g., a negative electrode) and a second electrode 20 (e.g., a positive electrode) that are formed of at least one electrode plate and are disposed between the separators 30.

The body 1 may be provided having a same number of the electrode plates of the first electrode 10, the electrode plates of the second electrode 20, and the separators 30. In an embodiment, for example, in the unit body 1, the electrode plates of the first electrode 10, the electrode plates of the second electrode 20, and the separators 30 are provided as two, respectively.

In an embodiment, the separators 30 are provided as two sheets, and include a first region AR1 and a second region AR2 that are folded to face each other and are divided based on a folding center therebetween. In an embodiment, for example, the separators 30 include an outer sheet 31 disposed outside in the folded state and an inner sheet 32 disposed inside in the folded state.

The electrode plates forming the first electrode 10 and the electrode plates forming the second electrode 20 are alternately stacked while interposing the outer sheet 31 and the inner sheet 32 in the first region AR1 and the second region AR2, thereby forming the unit cells to undergo the charge and the discharge.

In an embodiment, for example, the first electrode 10 includes a first first electrode plate 11 disposed in the first region AR1 between the outer sheet 31 and the inner sheet 32, and a second first electrode plate 12 disposed in the second region AR2 (referring to FIG. 2).

The second electrode 20 includes a first second electrode plate 21 disposed in the first region AR1 while corresponding to the first first electrode plate 11 outside the outer sheet 31, and a second second electrode plate 22 disposed in the second region AR2 while corresponding to the second first electrode plate 12 inside the inner sheet 32 (referring to FIG. 2).

By disposing the first first and second first electrode plates 11 and 12 and the first second and second second electrode plates 21 and 22 inside and outside of the outer and inner sheets 31 and 32 and folding the outer and inner sheets 31 and 32 with reference to the folding center to manufacture the unit body 1, the alignment of the separator 30 and the first and second electrodes 10 and 20 may be easily performed in the manufacturing process of the unit body 1.

Referring to FIG. 3, the unit body 1 forms one unit cell in the first region AR1 by the folding of the outer sheet 31 and the inner sheet 32, further forms one unit cell in the second region AR2, and further forms one unit cell between the first region AR1 and the second region AR2.

That is, the first second electrode plate 21, the outer sheet 31, the first first electrode plate 11, and the inner sheet 32 form one unit cell in the first region AR1. The second second electrode plate 22, the inner sheet 32, the second first electrode plate 12, and the outer sheet 31 form one unit cell in the second region AR2. The first first electrode plate 11 of the first region AR1, the inner sheet 32, and the second second electrode plate 22 of the second region AR2 form one unit cell between the first region AR1 and the second region AR2.

Figure 4:
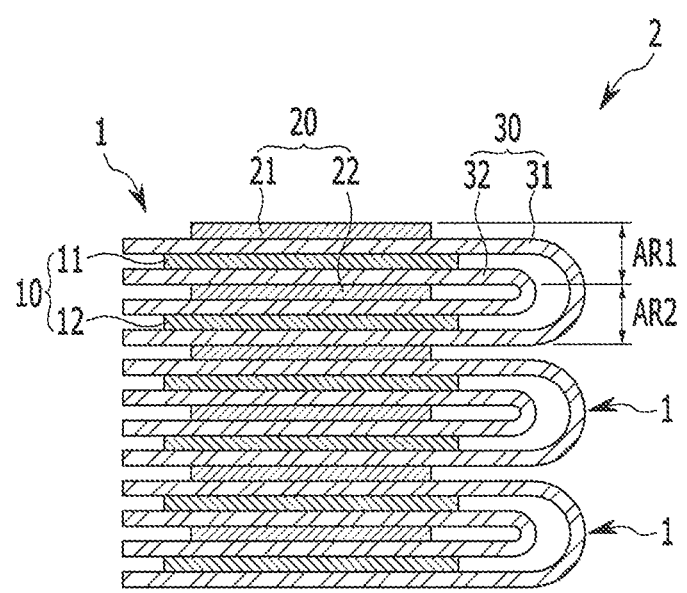
FIG. 4 is a cross-sectional view of an electrode assembly formed by stacking unit bodies of FIG. 3.

FIG. 4 is a cross-sectional view of an electrode assembly formed by stacking unit bodies of FIG. 3. Referring to FIG. 1 and FIG. 4, the electrode assembly 2 is formed by the plurality of unit bodies 1 to be electrically connected. For example, the unit bodies 1 may be electrically connected to each other through the lead tabs 4 and 5 (referring to FIG. 1).

As the electrode assembly 2 is formed by stacking the unit bodies 1, an increase in capacity of the battery may be obtained while facilitating the manufacturing process of the electrode assembly 2. That is, the unit bodies 1 may improve the production efficiency and the quality stability of the electrode assembly 2 and the rechargeable battery.

Again referring to FIG. 1, the electrode plates of the first electrode 10 and the electrode plates of the second electrode 20 respectively include a coated region where an active material is coated to a current collector made of a metal (e.g., Cu or Al) thin plate, and an uncoated region formed of the current collector that is not coated with the active material to be exposed. The lead tabs 4 and 5 are connected to the uncoated region of the electrode plates to be drawn outside the case 3.

In an embodiment, for example, the case 3 is formed as a pouch having flexibility, and includes a first exterior portion 301 and a second exterior portion 302 receiving the electrode assembly 2 and facing each other. In an embodiment, the first exterior portion 301 and the second exterior portion 302 are heat-sealed with a width (e.g., a predetermined width) along an exterior of the built electrode assembly 2. Although not shown, the case may be formed by forming and heat-sealing the first and second exterior portions with a same shape as the first exterior portion.

The lead tabs 4 and 5 are drawn outside the case 3 between the first and second exterior portions 301 and 302 while interposing an insulating member (not shown). In an embodiment, for example, the case 3 includes an inner sheet S1, a metal sheet S2, and an outer sheet S3. The first and second exterior portions 301 and 302 may be formed of the inner sheet S1, the outer sheet S3, and the metal sheet S2 of a same layered structure.

The inner sheet S1 forms an inner surface of the case 3 and may be formed of a polymer sheet to be effective for insulating and heat-sealing. The outer sheet S3 forms an outer surface of the case 3 and may be formed of a polyethylene terephthalate (PET) sheet, a nylon sheet, or a PET-nylon composite sheet to be effective for the protection. The metal sheet S2 is provided between the inner and outer sheets S1 and S3 and may be formed of an aluminum sheet to provide mechanical integrity to the case 3.

Next, some other exemplary embodiments of the present invention will be described. While comparing the following exemplary embodiments with the above-described exemplary embodiments, the description for the same configurations may be omitted and different configurations will be described.

Figure 5:
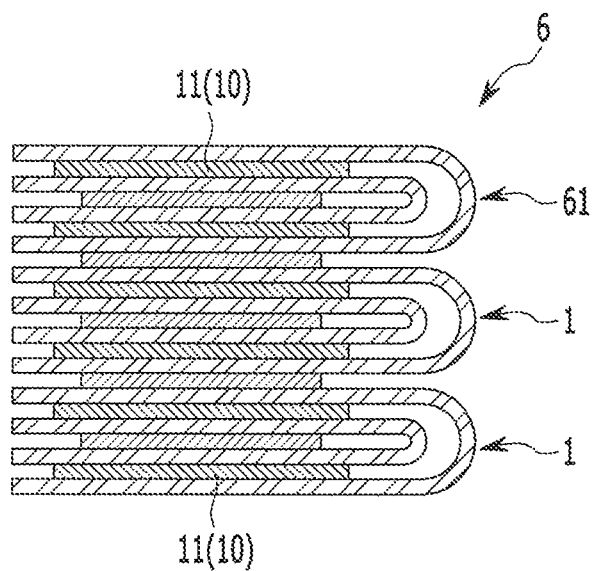
FIG. 5 is a cross-sectional view of an electrode assembly (including an outermost unit body and unit bodies of FIG. 3) of a rechargeable battery according to another exemplary embodiment of the present invention.

FIG. 5 is a cross-sectional view of an electrode assembly (including an outermost unit body and unit bodies of FIG. 3) of a rechargeable battery according to another exemplary embodiment of the present invention. Referring to FIG. 5, an electrode assembly 6 applied to the rechargeable battery according to another exemplary embodiment further includes an outermost unit body 61 provided at one outermost side. That is, the electrode assembly 6 is formed by stacking a plurality of the unit bodies 1 (e.g., two unit bodies) of FIG. 3 and stacking the outermost unit body 61 outermost of one side of the stacked structure.

Figure 6:
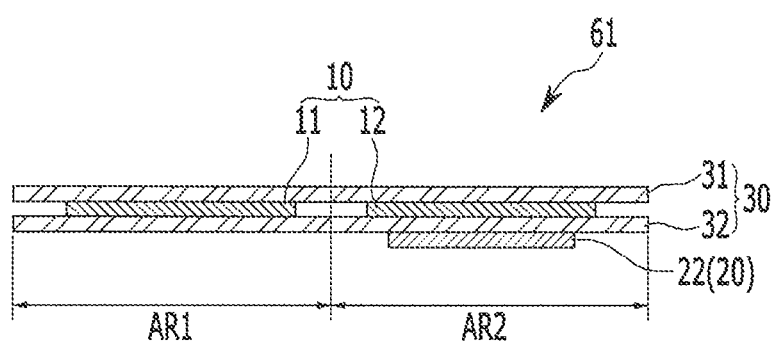
FIG. 6 is a cross-sectional view of a state in which electrode plates and separators are stacked to form an outermost unit body applied to an electrode assembly of FIG. 5.
Figure 7:
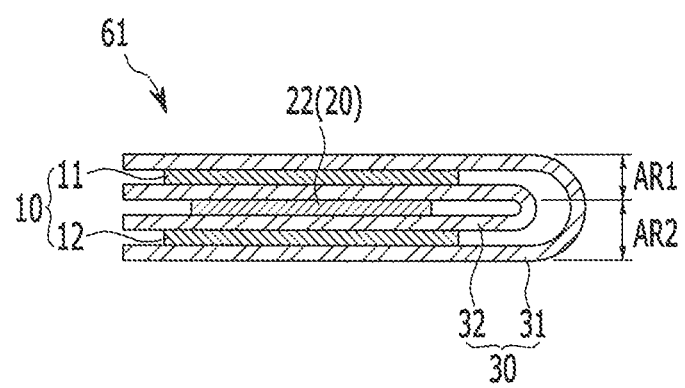
FIG. 7 is a cross-sectional view of an outermost unit body formed by folding separators in a stacked state of FIG. 6.

FIG. 6 is a cross-sectional view of a state in which electrode plates and separators are stacked to form an outermost unit body applied to an electrode assembly of FIG. 5; and FIG. 7 is a cross-sectional view of an outermost unit body formed by folding separators in a stacked state of FIG. 6.

Referring to FIG. 6 and FIG. 7, the outermost unit body 61 includes a same number of the electrode plates of the first electrode 10 and the separators 30, and includes a smaller number of the electrode plates of the second electrode 20 than the electrode plates of the first electrode 10 by one. In an embodiment, for example, in the outermost unit body 61, two electrode plates of the first electrode 10, two separators 30, and one electrode plate of the second electrode 20 are provided.

In the outermost unit body 61, the separators 30 include the first region AR1 and the second region AR2 at which two sheets are disposed to face each other and are folded with respect to the folding center. In an embodiment, the separators 30 include the outer sheet 31 disposed outside in the folded state and the inner sheet 32 disposed inside in the folded state.

In an embodiment, for example, the first electrode 10 includes the first first electrode plate 11 disposed in the first region AR1 and the second first electrode plate 12 disposed in the second region AR2 between the outer sheet 31 and the inner sheet 32 (referring to FIG. 6).

The second electrode 20 includes the second second electrode plate 22 disposed in the second region AR2 while corresponding to the first first and second first electrode plates 11 and 12 inside the folded inner sheet 32 (referring to FIG. 6 and FIG. 7).

Referring to FIG. 7, the outermost unit body 61 forms one unit cell in the second region AR2 by the folding of the outer sheet 31 and the inner sheet 32 facing each other, and further forms one unit cell between the first region AR1 and the second region AR2.

That is, in the second region AR2, the second second electrode plate 22, the inner sheet 32, the second first electrode plate 12, and the outer sheet 31 form one unit cell. The first first electrode plate 11 of the first region AR1, the inner sheet 32, and the second second electrode plate 22 of the second region AR2 form one unit cell between the first region AR1 and the second region AR2.

As the outermost unit body 61 is disposed at one outermost side of the electrode assembly 6, the first first electrode plate 11 of the first electrode 10 is disposed outermost. Accordingly, the first first electrode plate 11 and the second first electrode plate 12 forming the first electrode 10 (e.g., the negative electrode) are respectively disposed at outermost sides of the electrode assembly 6, thereby improving the safety of the electrode assembly 6.

Figure 8:
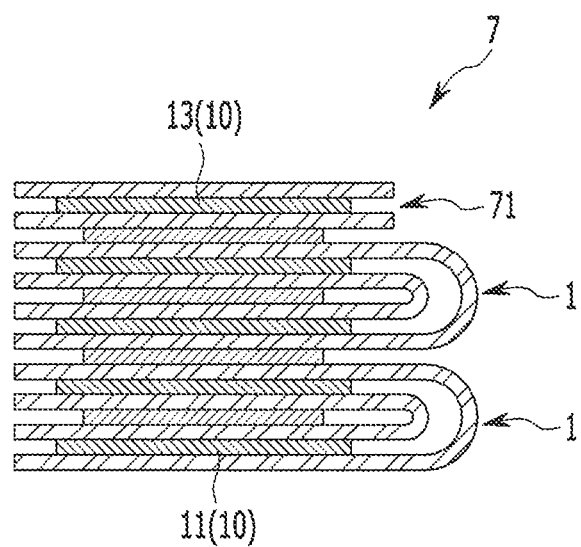
FIG. 8 is a cross-sectional view of an electrode assembly (including an outermost unit body and unit bodies of FIG. 3) of a rechargeable battery according to another exemplary embodiment of the present invention.

FIG. 8 is a cross-sectional view of an electrode assembly (including an outermost unit body and unit bodies of FIG. 3) of a rechargeable battery according to another exemplary embodiment of the present invention. Referring to FIG. 8, an electrode assembly 7 applied to the rechargeable battery according to another exemplary embodiment further includes an outermost unit body 71 provided at one outermost side thereof. That is, the electrode assembly 7 is formed by stacking a plurality of unit bodies of FIG. 3 (e.g., two unit bodies) and stacking the outermost unit body 71 outermost of one side of the stacked structure.

Figure 9:
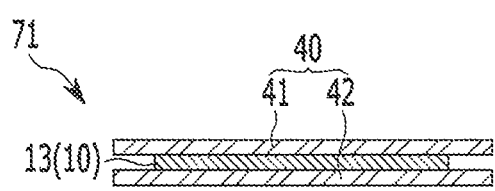
FIG. 9 is a cross-sectional view of an outermost unit body (including an electrode plate and separators) applied to an electrode assembly of FIG. 8.

FIG. 9 is a cross-sectional view of an outermost unit body (including an electrode plate and separators) applied to an electrode assembly of FIG. 8. Referring to FIG. 9, the outermost unit body 71 is formed by disposing separators 40 at both surfaces of the first electrode 10. The separators 40 include an outer sheet 41 and an inner sheet 42, and the first electrode 10 includes a third first electrode plate 13 disposed between the outer sheet 41 and the inner sheet 42.

As the outermost unit body 71 is disposed at one outermost side of the electrode assembly 7, the third first electrode plate 13 of the first electrode 10 is disposed outermost. Accordingly, the first first electrode plate 11 and the third first electrode plate 13 forming the first electrode 10 (e.g., negative electrode) are disposed at both outermost sides of the electrode assembly 7, thereby improving the safety of the electrode assembly 7.

Figure 10:
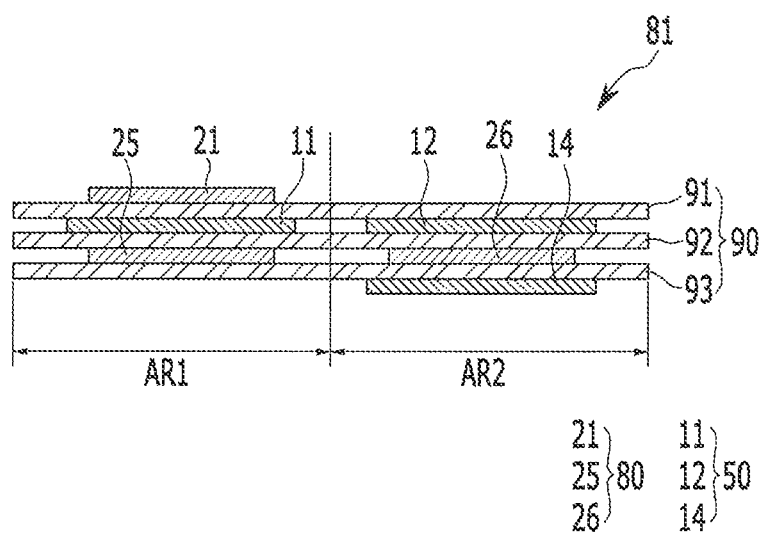
FIG. 10 is a cross-sectional view of a state in which electrode plates and separators are stacked to form a unit body applied to an electrode assembly of a rechargeable battery according to another exemplary embodiment of the present invention.
Figure 11:
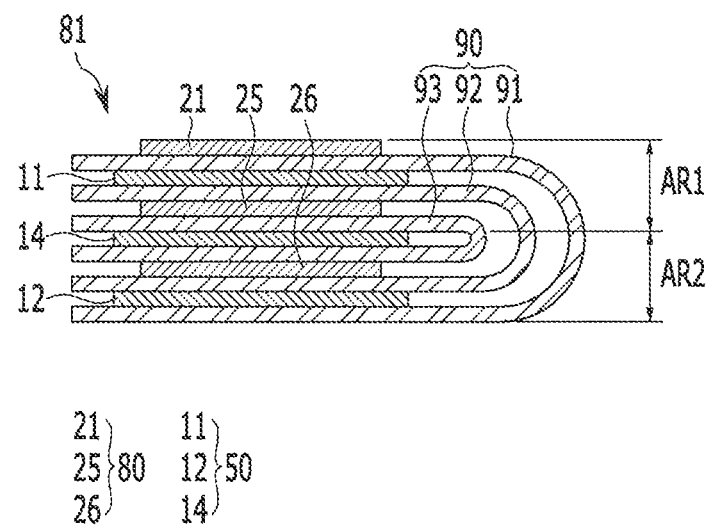
FIG. 11 is a cross-sectional view of a unit body formed by folding separators in a stacked state of FIG. 10.

FIG. 10 is a cross-sectional view of a state in which electrode plates and separators are stacked to form a unit body applied to an electrode assembly of a rechargeable battery according to another exemplary embodiment of the present invention; and FIG. 11 is a cross-sectional view of a unit body formed by folding separators in a stacked state of FIG. 10. Referring to FIG. 10 and FIG. 11, a unit body 81 includes three electrode plates of a first electrode 50 and three electrode plates of a second electrode 80, and three separators 90.

The separators 90 are provided as three sheets, and include the first region AR1 and the second region AR2 that are folded to face each other and are divided with respect to the folding center. In an embodiment, for example, the separators 90 include an outer sheet 91 disposed outside in the folded state, an inner sheet 93 disposed inside in the folded state, and a middle sheet 92 disposed between the outer sheet 91 and the inner sheet 93.

The electrode plates forming the first electrode 50 and the electrode plates forming the second electrode 80 are alternately stacked while interposing the outer sheet 91, the middle sheet 92, and the inner sheet 93 in each of the first region AR1 and the second region AR2.

The first electrode 50 includes the first first electrode plate 11 disposed in the first region AR1 between the outer sheet 91 and the middle sheet 92, the second first electrode plate 12 disposed in the second region AR2 between the outer sheet 91 and the middle sheet 92, and the fourth first electrode plate 14 disposed between the folded inner sheet 93 (referring to FIG. 11).

The second electrode 80 includes the first second electrode plate 21 corresponding to the first first electrode plate 11 outside the outer sheet 91 and disposed in the first region AR1, a fifth second electrode plate 25 corresponding to the first first electrode plate 11 and the fourth first electrode plate 14 between the middle sheet 92 and the inner sheet 93 and disposed in the first region AR1, and a sixth second electrode plate 26 corresponding to the second first electrode plate 12 and the fourth first electrode plate 14 and disposed in the second region AR2 (referring to FIG. 10).

As the first first, second first, and fourth first electrode plates 11, 12, and 14 and the first second, fifth second, and sixth second electrode plates 21, 25, and 26 are disposed outside and inside the outer, middle, and inner sheets 91, 92, and 93, and the outer, middle, and inner sheets 91, 92, and 93 are folded with respect to the folding center to manufacture the unit body 81, the separator 90 and the first and second electrodes 50 and 80 may be easily aligned in the manufacturing process of the unit body 81.

Referring to FIG. 11, the unit body 81 forms two unit cells in the first region AR1 and two unit cells in the second region AR2 by the folding of the outer sheet 91, the middle sheet 92, and the inner sheet 93 facing each other, and further forms one unit cell between the first region AR1 and the second region AR2.

That is, in the first region AR1, the first second electrode plate 21, the outer sheet 91, the first first electrode plate 11, the middle sheet 92, the fifth second electrode plate 25, and the inner sheet 93 form two unit cells. In the second region AR2, the fourth first electrode plate 14, the inner sheet 93, the sixth second electrode plate 26, the middle sheet 92, the second first electrode plate 12, and the outer sheet 91 form two unit cells. The fifth second electrode plate 25, the inner sheet 93, and the fourth first electrode plate 14 form one unit cell between the first region AR1 and the second region AR2.

Figure 12:
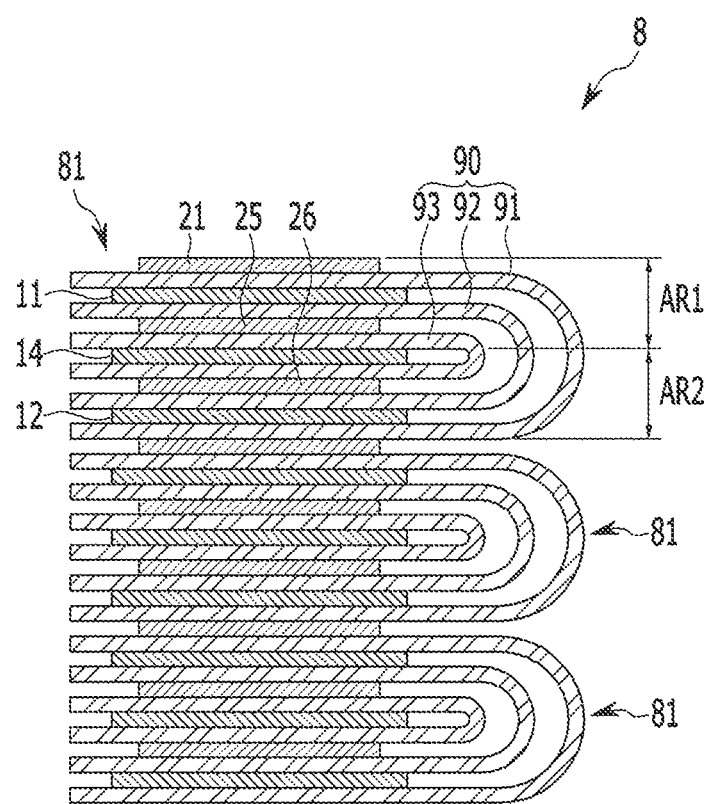
FIG. 12 is a cross-sectional view of an electrode assembly formed by stacking unit bodies of FIG. 11.

FIG. 12 is a cross-sectional view of an electrode assembly formed by stacking unit bodies of FIG. 11. Referring to FIG. 12, an electrode assembly 8 is formed by stacking and electrically connecting the plurality of unit bodies 81 to each other. Although not shown, the unit bodies may be electrically connected to each other through the lead tab.

The unit bodies 81 are stacked to form the electrode assembly 8 such that the manufacturing process of the electrode assembly 8 may be facilitated, and the capacity of the battery may be increased. That is, the unit bodies 81 may improve the manufacturing efficiency and secure the quality of the electrode assembly 8 and the rechargeable battery.

Figure 13:
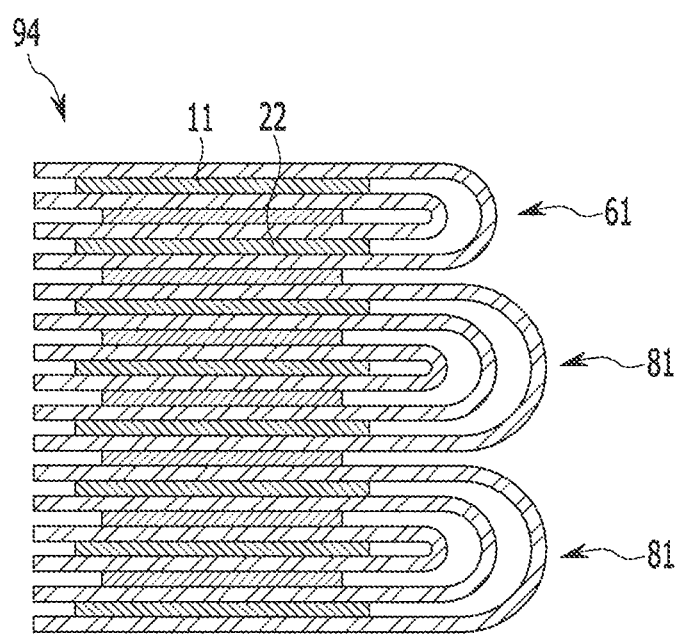
FIG. 13 is a cross-sectional view of an electrode assembly (including a unit body of FIG. 11 and an outermost unit body of FIG. 7) of a rechargeable battery according to another exemplary embodiment of the present invention.

FIG. 13 is a cross-sectional view of an electrode assembly (including a unit body of FIG. 11 and an outermost unit body of FIG. 7) of a rechargeable battery according to another exemplary embodiment of the present invention Referring to FIG. 13, an electrode assembly 94 applied to the rechargeable battery according to another exemplary embodiment further includes the outermost unit body 61 provided at one outermost side thereof.

That is, the electrode assembly 94 is formed by stacking a plurality of the unit bodies 81 of FIG. 11 (e.g., two unit bodies) and stacking the outermost unit body 61 of FIG. 7 at the outermost stacked side.

As the outermost unit body 61 is disposed at one outermost side of the electrode assembly 94, the first first electrode plate 11 of the first electrode 50 is disposed outermost. Accordingly, the first first electrode plate 11 and the second first electrode plate 12 forming the first electrode 30 (e.g., the negative electrode) are respectively disposed at outermost sides of the electrode assembly 94, thereby improving the safety of the electrode assembly 94.

Figure 14:
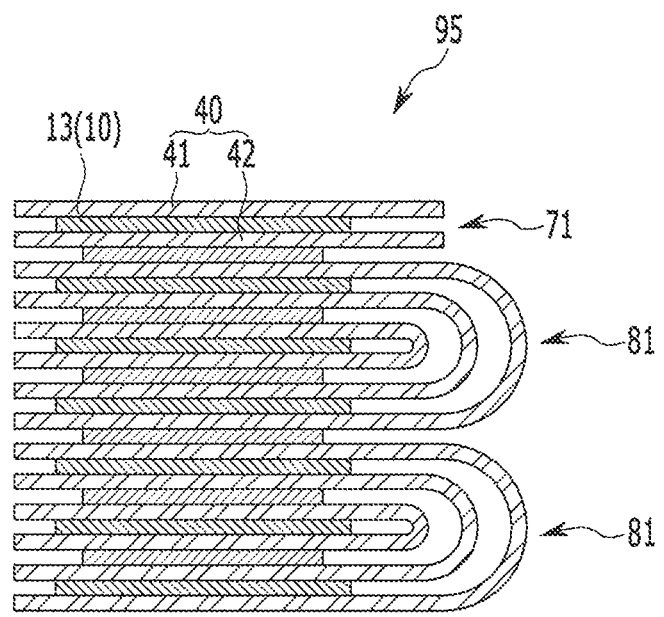
FIG. 14 is a cross-sectional view of an electrode assembly (including a unit body of FIG. 11 and an outermost unit body of FIG. 9) of a rechargeable battery according to another exemplary embodiment of the present invention.

FIG. 14 is a cross-sectional view of an electrode assembly (including a unit body of FIG. 11 and an outermost unit body of FIG. 9) of a rechargeable battery according to another exemplary embodiment of the present invention. Referring to FIG. 14, an electrode assembly 95 applied to the rechargeable battery according to another exemplary embodiment further includes the outermost unit body 71 provided at one outermost side thereof.

That is, the electrode assembly 95 is formed by stacking a plurality of the unit bodies 81 (e.g., two unit bodies) of FIG. 11 and stacking the outermost unit body 71 of FIG. 9 at one outermost side of the stacked structure.

As the outermost unit body 71 is disposed at one outermost side of the electrode assembly 95, the third first electrode plate 13 of the first electrode 10 is disposed outermost. Accordingly, the third first electrode plate 13 and the second first electrode plate 12 forming the first electrode 10 (e.g., the negative electrode) are respectively disposed at outermost sides of the electrode assembly 95, thereby improving the safety of the electrode assembly 95.

Figure 15:
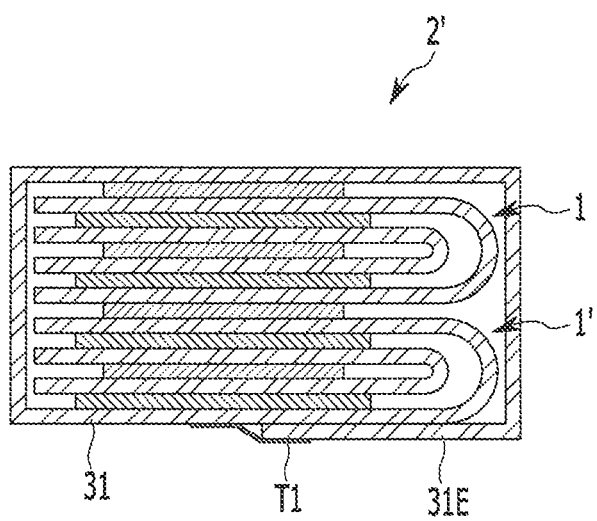
FIG. 15 is a cross-sectional view of an electrode assembly (formed by stacking a unit body of FIG. 3 and a variation of a unit body of FIG. 3) of a rechargeable battery according to another exemplary embodiment of the present invention.

FIG. 15 is a cross-sectional view of an electrode assembly (formed by stacking a unit body of FIG. 3 and a variation of a unit body of FIG. 3) of a rechargeable battery according to another exemplary embodiment of the present invention. Referring to FIG. 15, in an electrode assembly 2' of the rechargeable battery according to another exemplary embodiment of the present invention, a unit body 1' provided at the lowest side further includes an extending part 31E in the outer sheet 31.

Figure 16:
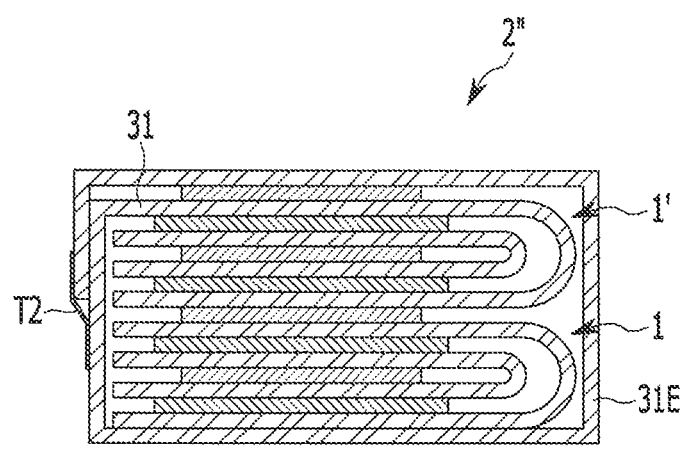
FIG. 16 is a cross-sectional view of an electrode assembly (formed by stacking a unit body of FIG. 3 and a variation of a unit body of FIG. 3) of a rechargeable battery according to another exemplary embodiment of the present invention.

FIG. 16 is a cross-sectional view of an electrode assembly (formed by stacking a unit body of FIG. 3 and a variation of a unit body of FIG. 3) of a rechargeable battery according to another exemplary embodiment of the present invention. Referring to FIG. 16, in an electrode assembly 2" of the rechargeable battery according to another exemplary embodiment of the present invention, the unit body 1' provided uppermost further includes the extending part 31E at the outer sheet 31.

The extending part 31E of FIG. 15 and FIG. 16 covers the exteriors of the unit bodies 1 and 1' that are stacked in plural and is fixed by a finishing tape T1, T2. That is, the extending part 31E of the outer sheet 31 allows a process of covering with an electrical insulating coating material after forming the electrode assemblies 2' and 2" to be omitted. In FIG. 15 and FIG. 16, a difference is present in a length of the extending part 31E.

Figure 17:
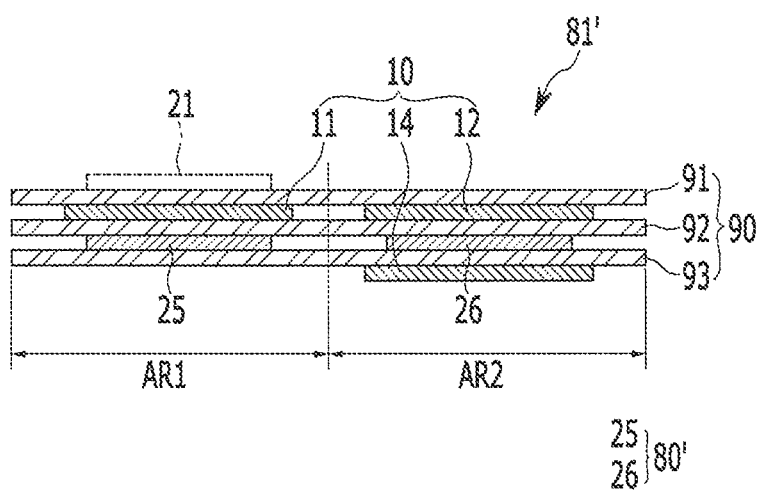
FIG. 17 is a cross-sectional view of a stacked state in which electrode plates and separators are stacked to form a unit body applied to an electrode assembly of a rechargeable battery according to another exemplary embodiment of the present invention (a variation of a unit body of FIG. 10).
Figure 18:
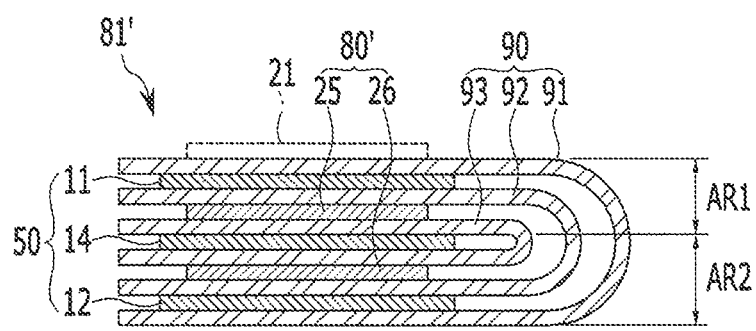
FIG. 18 is a cross-sectional view of a unit body formed by folding separators in a stacked state of FIG. 17 (a variation of a unit body of FIG. 11).

FIG. 17 is a cross-sectional view of a stacked state in which electrode plates and separators are stacked to form a unit body applied to an electrode assembly of a rechargeable battery according to another exemplary embodiment of the present invention (a variation of a unit body of FIG. 10); and FIG. 18 is a cross-sectional view of a unit body formed by folding separators in a stacked state of FIG. 17 (a variation of a unit body of FIG. 11).

Referring to FIG. 17 and FIG. 18, a unit body 81' is formed by removing or omitting the first second electrode plate 21 from the unit body 81 of FIG. 10 and FIG. 11. That is, the unit body 81' includes three electrode plates of the first electrode 50, two electrode plates of a second electrode 80', and three separators 90.

The second electrode 80' includes the fifth second electrode plate 25 corresponding to the first first electrode plate 11 and the fourth first electrode plate 14 between the middle sheet 92 and the inner sheet 93 and disposed in the first region AR1, and the sixth second electrode plate 26 corresponding to the second first electrode plate 12 and the fourth first electrode plate 14 and disposed in the second region AR2 (referring to FIG. 17).

Referring to FIG. 18, the unit body 81' forms one unit cell in the first region AR1 and two unit cells in the second region AR2 by the folding of the outer sheet 91, the middle sheet 92, and the inner sheet 93, and further forms one unit cell between the first region AR1 and the second region AR2.

That is, in the first region AR1, the outer sheet 91, the first first electrode plate 11, the middle sheet 92, the fifth second electrode plate 25, and the inner sheet 93 form one unit cell. In the second region AR2, the fourth first electrode plate 14, the inner sheet 93, the sixth second electrode plate 26, the middle sheet 92, the second first electrode plate 12, and the outer sheet 91 form two unit cells.

The fifth second electrode plate 25, the inner sheet 93, and the fourth first electrode plate 14 form one unit cell between the first region AR1 and the second region AR2. The unit body 81' does not include the first second electrode plate 21 of the second electrode 80 outermost, such that the electrical insulating performance may be improved.

Figure 19:
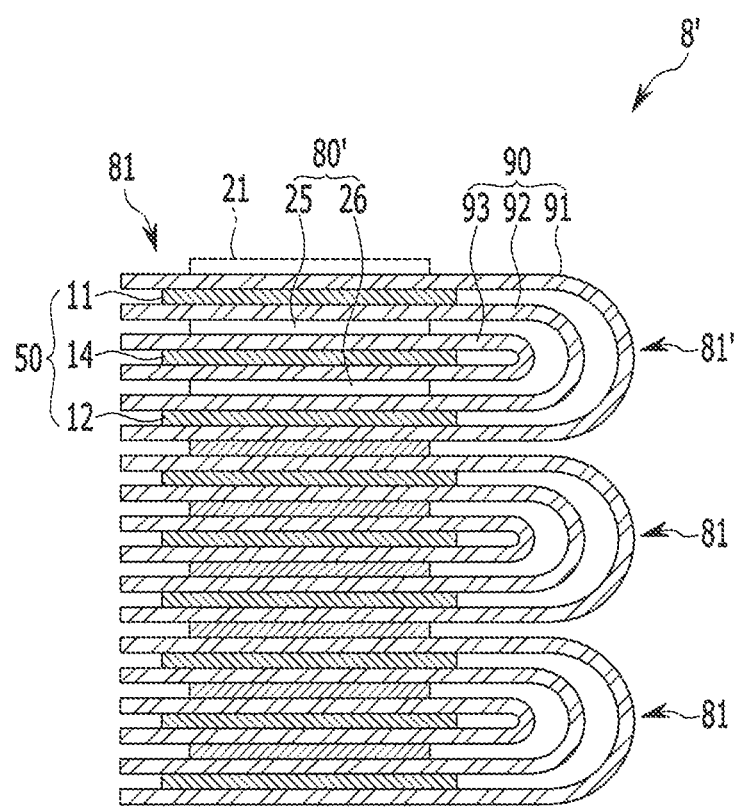
FIG. 19 is a cross-sectional view of an electrode assembly formed by stacking unit bodies of FIG. 18 (a variation of an electrode assembly of FIG. 12, that is, a unit body of FIG. 11 and a unit body of FIG. 18).

FIG. 19 is a cross-sectional view of an electrode assembly formed by stacking unit bodies of FIG. 18 (a variation of an electrode assembly of FIG. 12, that is, a unit body of FIG. 11 and a unit body of FIG. 18). Referring to FIG. 19, an electrode assembly 8' is formed by stacking and electrically connecting a plurality of the unit bodies 81 and 81' to each other. Although not shown, the unit bodies may be electrically connected to each other through the lead tab.

The unit bodies 81 and 81' are stacked to form the electrode assembly 8' such that the capacity of the battery may be increased while facilitating the manufacturing process of the electrode assembly 8'. That is, the unit bodies 81 and 81' may improve the production efficiency and the quality stability of the electrode assembly 8' and the rechargeable battery. The electrode assembly 8' is provided with the unit body 81' at one outermost side thereof such that the first second electrode plate of the second electrode is not disposed outermost, thereby improving the electrical insulating performance.

Figure 20:
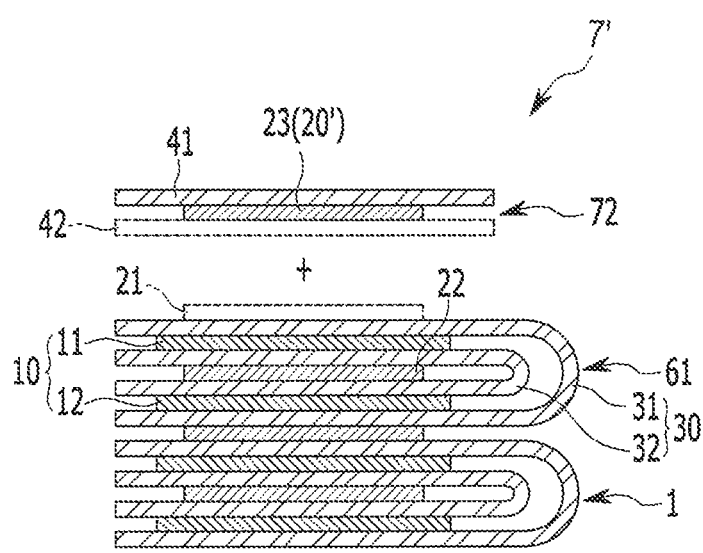
FIG. 20 is a cross-sectional view of a state in which unit bodies applied to an electrode assembly of a rechargeable battery according to another exemplary embodiment of the present invention are separated (a unit body of FIG. 3 and FIG. 7 and a variation of an outermost unit body of FIG. 9).
Figure 21:
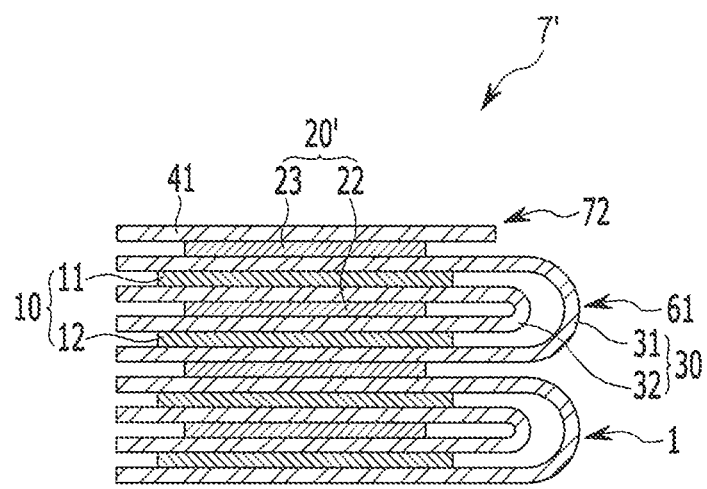
FIG. 21 is a cross-sectional view of an electrode assembly formed by stacking unit bodies of FIG. 20 (a variation of an electrode assembly of FIG. 8).

FIG. 20 is a cross-sectional view of a state in which unit bodies applied to an electrode assembly of a rechargeable battery according to another exemplary embodiment of the present invention are separated (a unit body of FIG. 3 and FIG. 7 and a variation of an outermost unit body of FIG. 9);

and FIG. 21 is a cross-sectional view of an electrode assembly formed by stacking unit bodies of FIG. 20 (a variation of an electrode assembly of FIG. 8).

Referring to FIG. 20 and FIG. 21, an electrode assembly 7' of the rechargeable battery according to another exemplary embodiment of the present invention further includes an additional unit body 72 that is additionally provided outermost of where the unit body 1 and the outermost unit body 61 are stacked.

The additional unit body 72 is formed in a state in which the inner sheet 42 is removed or omitted from the outermost unit body 71. The additional unit body 72 includes the separator that is the outer sheet 41 disposed outside a second electrode 20'.

The second electrode 20' includes a third second electrode plate 23 disposed between the outer sheet 41 of the additional unit body 72 and the outer sheet 31 of the outermost unit body 61. The additional unit body 72 is further disposed outside of the outermost unit body 61 on one side of the electrode assembly 7', and the third second electrode plate 23 of the second electrode 20' is disposed outermost. Accordingly, the safety of the electrode assembly 7' may be further improved.

The outermost unit body 61 includes a same number of the electrode plates of the first electrode 10 and the separators 30, and includes a smaller number of the electrode plates of the second electrode 20' than the electrode plates of the first electrode 10 by one. In an embodiment, the electrode plates of the first electrode 10 and the separators 30 are each provided as two in the outermost unit body 61, and one electrode plate of the second electrode 20' is provided.

In the outermost unit body 61, the separators 30 are disposed as two sheets, are divided based on the folding center at which two sheets face each other and are folded, and include the outer sheet 31 disposed outside in the folded state and the inner sheet 32 disposed inside in the folded state.

The first electrode 10 includes the first first electrode plate 11 and the second first electrode plate 12 disposed between the outer sheet 31 and the inner sheet 32. The second electrode 20' includes the second second electrode plate 22 disposed corresponding to the first first and second first electrode plates 11 and 12 inside the folded inner sheet 32. Accordingly, the third second electrode plate 23 of the additional unit body 72 and the first first electrode plate 11 of the outermost unit body 61 form the unit cell while interposing the outer sheet 31.

Figure 22:
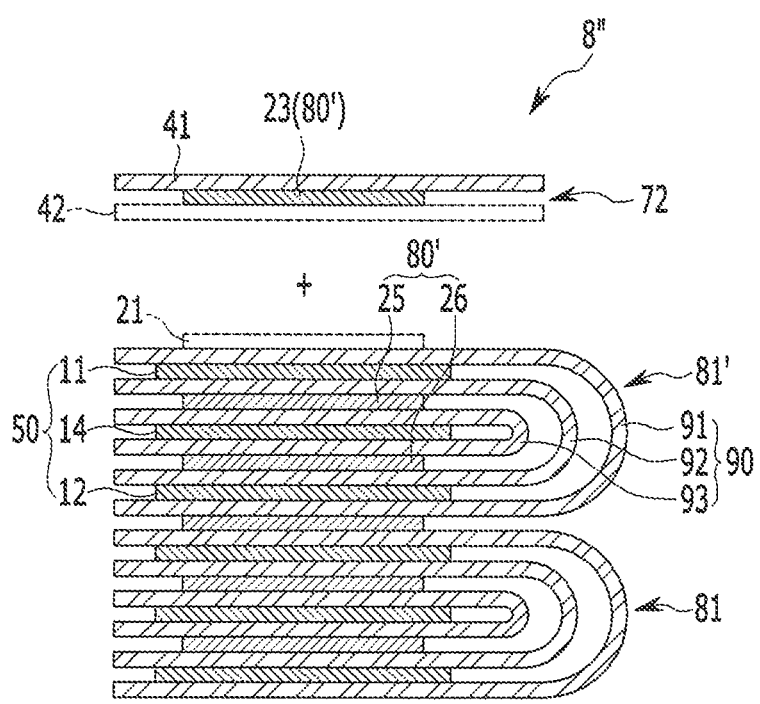
FIG. 22 is a cross-sectional view of a state in which unit bodies applied to an electrode assembly of a rechargeable battery according to another exemplary embodiment of the present invention are separated (a unit body of FIG. 11 and FIG. 18 and a variation of an outermost unit body of FIG. 9).
Figure 23:
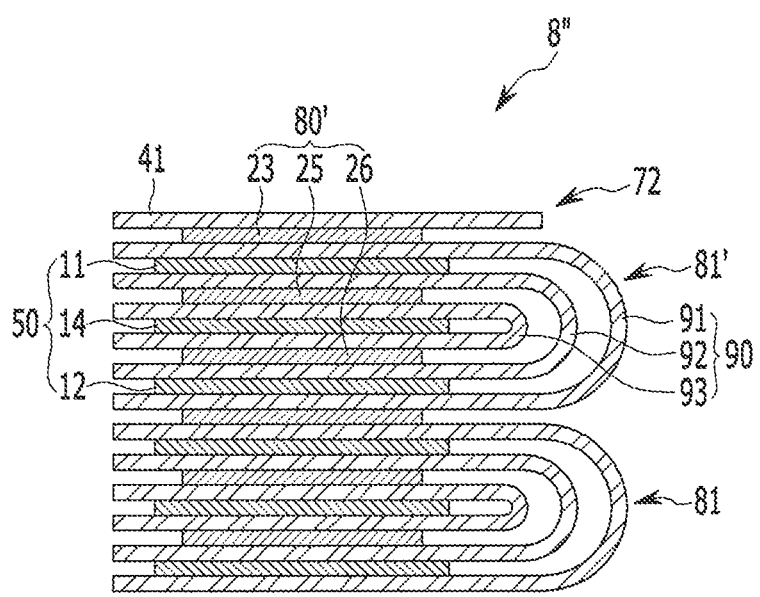
FIG. 23 is a cross-sectional view of an electrode assembly formed by stacking unit bodies of FIG. 22 (a variation of an electrode assembly of FIG. 14).

FIG. 22 is a cross-sectional view of a state in which unit bodies applied to an electrode assembly of a rechargeable battery according to another exemplary embodiment of the present invention are separated (a unit body of FIG. 11 and FIG. 18 and a variation of an outermost unit body of FIG. 9); and FIG. 23 is a cross-sectional view of an electrode assembly formed by stacking unit bodies of FIG. 22 (a variation of an electrode assembly of FIG. 14).

Referring to FIG. 22 and FIG. 23, an electrode assembly 8''' of the rechargeable battery according to another exemplary embodiment of the present invention includes the unit body 81 and the additional unit body 72 additionally provided at the outside where the unit body 81' (corresponding to the outermost unit body 61 of FIG. 20) disposed outermost is stacked.

The additional unit body 72 is formed of the state in which the inner sheet 42 (referring to FIG. 9) is removed or omitted from the outermost unit body 71. The additional unit body 72 includes the separator that is the outer sheet 41 that is disposed outside the second electrode 80'.

The second electrode 80' includes the third second electrode plate 23 disposed between the outer sheet 41 of the additional unit body 72 and the outer sheet 91 of the unit body 81'. As the additional unit body 72 is further disposed outside the outer unit body 81' at one side of the electrode assembly 8''', the third second electrode plate 23 of the second electrode 80' is disposed outermost. Accordingly, the safety of the electrode assembly 8''' may be improved.

The unit body 81' includes a same number of the electrode plates of the first electrode 50 and the separators 90, and includes a smaller number of the electrode plates of the second electrode 80' by one. In the unit body 81', three electrode plates of the first electrode 50 and three separators 90 are provided, and two electrode plates of the second electrode 80' are provided.

In the unit body 81', the separators 90 are disposed as three sheets, are divided based on the folding center at which the three sheets face each other and are folded, and include the outer sheet 91 disposed outside in the folded state, the inner sheet 93 disposed inside in the folded state, and the middle sheet 92 disposed between the outer sheet 91 and the inner sheet 93.

The first electrode 50 includes the first first electrode plate 11 and the second first electrode plate 12 disposed between the outer sheet 91 and the middle sheet 92, and the fourth first electrode plate 14 disposed within the inner sheet 93.

The second electrode 80' includes the fifth second electrode plate 25 disposed corresponding to the first first electrode plate 11 and the fourth first electrode plate 14 between the middle sheet 92 and the inner sheet 93, and the sixth second electrode plate 26 disposed corresponding to the second first electrode plate 12 and the fourth first electrode plate 14.

Accordingly, the third second electrode plate 23 of the additional unit body 72 and the first first electrode plate 11 of the unit body 81' form the unit cell while interposing the outer sheet 91.

While the present invention has been described in connection with what are presently considered to be some practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly including at least a unit body including a first region and a second region that are divided based on a folding center in which separators including at least two facing sheets are folded, and electrode plates of a first electrode and electrode plates of a second electrode, wherein the electrode plates of the first electrode and the electrode plates of the second electrode are alternately stacked with the separators therebetween in each of the first region and the second region; and
   a case receiving the electrode assembly and an electrolyte solution.

2. The rechargeable battery of claim 1, wherein the unit body includes a same number of the electrode plates of the first electrode, the electrode plates of the second electrode, and the separators.

3. The rechargeable battery of claim 2, wherein the separators include:
   an outer sheet arranged outermost of two sheets arranged to be folded; and an inner sheet arranged innermost of the two sheets arranged to be folded.

4. The rechargeable battery of claim 3, wherein the first electrode includes:
a first first electrode plate arranged in the first region; and
a second first electrode plate arranged in the second region between the outer sheet and the inner sheet.

5. The rechargeable battery of claim 4, wherein the second electrode includes:
a first second electrode plate corresponding to the first first electrode plate and arranged in the first region outside the outer sheet; and
a second second electrode plate corresponding to the second first electrode plate and arranged in the second region inside the inner sheet.

6. The rechargeable battery of claim 5, wherein the unit body forms one unit cell by the first second electrode plate, the outer sheet, the first first electrode plate, and the inner sheet in the first region, further forms one unit cell by the second second electrode plate, the inner sheet, the second first electrode plate, and the outer sheet in the second region, and further forms one unit cell by the first first electrode plate, the inner sheet, and the second second electrode plate between the first region and the second region through the folding of the outer sheet and the inner sheet.

7. The rechargeable battery of claim 6, wherein the electrode assembly is formed by stacking a plurality of unit bodies in one direction.

8. The rechargeable battery of claim 1, wherein the electrode assembly further includes an outermost unit body provided at an outermost side thereof.

9. The rechargeable battery of claim 8, wherein
the separators in the outermost unit body include an outer sheet arranged outermost of two sheets arranged to be folded, and an inner sheet arranged innermost of the two sheets arranged to be folded,
the first electrode includes a first first electrode plate in the first region and a second first electrode plate arranged in the second region between the outer sheet and the inner sheet, and
the second electrode includes a second second electrode plate corresponding to the first first electrode plate and the second first electrode plate inside the folded inner sheet and arranged in the second region.

10. The rechargeable battery of claim 8, wherein
the outermost unit body is formed by arranging the separators at both surfaces of the first electrode, the separators include an outer sheet and an inner sheet, and
the first electrode includes a third first electrode plate arranged between the outer sheet and the inner sheet.

11. The rechargeable battery of claim 2, wherein the separators include:
an outer sheet arranged outermost of three sheets arranged to be folded;
an inner sheet arranged innermost of the three folded sheets;
and a middle sheet between the outer sheet and the inner sheet.

12. The rechargeable battery of claim 11, wherein the first electrode includes:
a first first electrode plate arranged in the first region;
a second first electrode plate arranged in the second region; and
a fourth first electrode plate arranged within the folded inner sheet between the outer sheet and the middle sheet, wherein the second electrode includes:
a first second electrode plate corresponding to the first first electrode plate and arranged in the first region outside the outer sheet;
a fifth second electrode plate corresponding to the first first electrode plate and the fourth first electrode plate and arranged in the first region between the middle sheet and the inner sheet; and
a sixth second electrode plate corresponding to the second first electrode plate and the fourth first electrode plate and arranged in the second region.

13. The rechargeable battery of claim 12, wherein the electrode assembly is formed by stacking a plurality of unit bodies in one direction.

14. The rechargeable battery of claim 13, wherein
the electrode assembly further includes an outermost unit body provided at an outermost side thereof, and
the outermost unit body forms one unit cell by the second second electrode plate, the inner sheet, the second first electrode plate, and the outer sheet in the second region, and further forms one unit cell by the outer sheet, the first first electrode plate, the inner sheet, and the second second electrode plate between the first region and the second region by the folding of the outer sheet and the inner sheet.

15. The rechargeable battery of claim 13, wherein
the electrode assembly further includes an outermost unit body at an outermost side thereof,
the outermost unit body is formed by arranging the separators at both surfaces of the first electrode,
the separators include an inner sheet and an outer sheet, and
the first electrode includes a third first electrode plate arranged between the outer sheet and the inner sheet.

16. The rechargeable battery of claim 8, wherein
the electrode assembly further includes an additional unit body provided at an outer side of the outermost unit body,
the additional unit body includes a separator as an outer sheet arranged outside the second electrode, and
the second electrode includes a third second electrode plate arranged between the outer sheet of the additional unit body and the outer sheet of the outermost unit body.

17. A rechargeable battery including an electrode unit body comprising:
a first separator;
a first electrode plate and a second electrode plate of a first electrode disposed to be separated from each other on one surface of the first separator;
a second separator disposed on the first electrode plate and the second electrode plate of the first electrode; and
a first electrode plate of a second electrode corresponding to the first electrode plate of the first electrode and disposed on one surface of the second separator,
wherein the first and the second separators are folded between the first electrode plate and the second electrode plate of the first electrode.

18. The rechargeable battery of claim 17, wherein:
in the electrode unit body,
the second electrode plate of the first electrode and the first electrode plate of the second electrode are stacked with the second separator therebetween.

19. The rechargeable battery of claim 17, wherein:
the electrode unit body further includes a second electrode plate of the second electrode corresponding to the second electrode plate of the first electrode and disposed on the other surface of the first separator.

20. The rechargeable battery of claim 19, wherein:
a plurality of electrode unit bodies is provided, and
the plurality of electrode unit bodies are stacked in one direction.

21. The rechargeable battery of claim 20, further comprising:
an outermost unit body provided at one side of the electrode unit body positioned at an outermost side of the plurality of electrode unit bodies.

22. The rechargeable battery of claim 21, wherein:
the outermost unit body includes
a third separator;
a third electrode plate and a fourth electrode plate of a first electrode disposed on one surface of the third separator to be separated from each other;
a fourth separator disposed on the third electrode plate and the fourth electrode plate of the first electrode; and
a third electrode plate of a second electrode corresponding to the third electrode plate of the first electrode and disposed on one surface of the fourth separator,
wherein the third and the fourth separators are folded between the third electrode plate and the fourth electrode plate of the first electrode.

23. The rechargeable battery of claim 21, wherein:
the outermost unit body includes
two separators facing to each other and an electrode plate of the first electrode interposed therebetween.

24. A manufacturing method of a rechargeable battery comprising:
disposing a first electrode plate and a second electrode plate of a first electrode to be separated from each other between a first separator and a second separator;
providing a first electrode plate of a second electrode to the first separator to correspond to the first electrode plate of the first electrode;
providing a second electrode plate of the second electrode to the second separator to correspond to the second electrode plate of the first electrode;
folding the first separator and the second separator between the first electrode plate and the second electrode plate of the first electrode to form an electrode unit body of an electrode assembly, the electrode unit body including a first region and a second region that are divided based on a folding center in which the first and second separators including at least two facing sheets are folded, wherein the first and second electrode plates of the first electrode and the first and second electrode plates of the second electrode are alternately stacked with the first and second separators therebetween in each of the first region and the second region; and
arranging the electrode assembly and an electrolyte solution in a case.

25. The manufacturing method of claim 24, further comprising:
manufacturing the electrode assembly by stacking a plurality of electrode unit bodies in one direction.

26. The manufacturing method of claim 25, wherein:
in the manufacturing of the electrode assembly,
an outermost unit body is further stacked at one side of an electrode unit body positioned at an outermost side of the plurality of electrode unit bodies.

27. The manufacturing method of claim 26, wherein:
in the manufacturing of the electrode assembly,
two electrode plates of the first electrode are disposed to be separated from each other between two separators,
after disposing an electrode plate of the second electrode corresponding to one of the two electrode plates of the first electrode on one surface of one of the two separators,
the two separators are folded between the two electrode plates of the first electrode to form the outermost unit body.

28. The manufacturing method of claim 27, wherein:
in the manufacturing of the electrode assembly,
an electrode plate of the first electrode is disposed between the two separators to form the outermost unit body.

* * * * *